Sept. 27, 1966  J. H. WIGGINS, JR  3,274,798
VIBRATION ISOLATOR
Filed June 17, 1964

John H. Wiggins Jr.
INVENTOR.

BY Harry C. Honeycutt
ATTORNEY 3,274,798
VIBRATION ISOLATOR
John H. Wiggins, Jr., Tulsa, Okla., assignor, by mesne assignments, to Esso Production Research Company, a corporation of Delaware
Filed June 17, 1964, Ser. No. 375,861
7 Claims. (Cl. 64—1)

This invention relates generally to the rotary drilling of boreholes in the earth and more particularly to an improved rotary drill column assembly. Specifically the invention relates to means for isolating vibration and shock in a drill column whereby the drilling action of conventional rotary bits is improved, and the life of the entire drilling rig and drill column is prolonged.

Prior investigations have repeatedly established the frequent occurrence of excess vibrations in the operation of a rotary drill string, and the consequent need for vibration control. Various shock absorbing sub-assemblies have been devised in the past, for connection in a drill string to minimize or reduce vibrations and shocks along substantially the entire length of the drill column.

Inasmuch as most shocks and vibrations originate at the drill bit, such tools are usually incorporated either immediately adjacent the bit, or at some point within a short distance above the bit. Such prior tools have involved primarily the use of conventional spring members such as coil springs, fluid compression springs, and of course, rubber springs, both in shear and in compression. Each of these spring types are capable of reducing vibrations and shock in the drill string; however, their use is accompanied by various disadvantages which have proven them to be uneconomical by virtue of their high cost and relatively short useful life under drilling environment.

In the rotary drilling environment many conditions are encountered which tend to destroy the useful properties of conventional spring materials. For example, corrosion, high temperatures, abrasion and fatigue conditions exist throughout the length of a drill column thereby shortening the life of the usual spring-type isolator which has been heretofore available. Add to these conditions high torsion and bending as well as compressional and tensile loads, including the necessity of providing fluid seals between high internal and low external zones of drilling mud circulation, and the physical requirements imposed upon such a tool become severe indeed.

In particular, the helical round bar, coil spring gives a relatively poor corrosion fatigue performance when unprotected and is also severely handicapped by design limitations which necessitate the use of sliding fluid seals, which cause operating difficulties and excessive friction wear. These lead to an uneconomically short life. Similarly, friction losses of various kinds have caused serious problems in connection with prior attempts to employ other conventional springs for the control of shocks and vibrations in a rotary drill column.

The fatigue life of rubber and the mode of its failure differs markedly from that of steel. Even though the ultimate strength of rubber may be 3,000 p.s.i. in tension, the working stress is still only about 100 p.s.i. in shear because fatigue breaks often occur suddenly without warning, and because different stocks of rubber and rubber-to-metal bonds introduce so much heterogeneity as to cause measured fatigue life to be undependable. Beyond an optimum cure the fatigue resistance of a stock and of its bonds to metal is lower the greater the cure time. Thus, several factors to be avoided in seeking a high fatigue resistance for rubber are: high stress concentrations, oven-cure, high temperatures, oil and oxidization. Temperatures become increasingly important when the rubber is contained between two metal sleeves, as is characteristic of the prior art, since the energy dissipated within the rubber by hysteresis is trapped, thereby raising the temperature of the rubber still further.

Oils deteriorate most rubbers. There are some polymers such as nitrile compounds which exhibit a resistance to oils superior to that of natural rubber. However, the mechanical properties of these products are somewhat inferior to those of natural rubber. For this and other reasons, compromises of some properties must be made to get the maximum life from a rubber-comprising tool, for use in modern drilling systems.

The most serious limitation of rubber is that it cannot be used at temperatures above 180° F., and therefore cannot be used at depths greater than about 11,000 ft. All the incentives for cutting drilling costs lies at depths (and temperatures) below 10,000 ft.

The hydraulic shock-isolator transmits static loads by means of a piston. That is, the difference between the internal pressure of a flowing mud column and the external pressure of the annular fluid carrying the drilling cuttings provides a means of transmitting static or average dead load to the bit. Although such tools are sound in theory, their use in practice has proven uneconomical because of high initial cost, short life due to friction wear and the failure of fluid seals, inflexibility in weight control, prevention of using optimum hydraulic procedures, and wear and tear on pumps.

Accordingly, it is an object of the present invention to provide apparatus capable of minimizing the transmission of vibrations and shock along a rotary drill column. More particularly, it is an object of the invention to provide a shock isolator which avoids most of the disadvantages characteristic of prior vibration control devices.

The apparatus of the present invention consists essentially of inner and outer, substantially concentric, tubular walls adapted for connection in a drill column whereby, in operation, the inner wall of the tool is loaded primarily in tension or compression, while the outer wall prevents excessive buckling of the inner member, resists bending, and transmits excess torsional, compressional, and tensile loads. The spring behavior of the preferred embodiments is dependent only upon the strength, Young's modulus and cross sectional area characteristics of the inner tubular member. For field application, it has been found that the inner member must be constructed of a material having a Young's modulus no greater than about $15 \times 10^6$ pounds per square inch, and a tensile strength of at least 50,000 p.s.i.

Recent studies have shown that an effective drill string shock isolator must be capable of filtering load vibration frequencies within the range of 0 to 50 c.p.s. having an amplitude within the range of 0 to 150,000 lbs. In order to effectively isolate such vibrations the inner tubular wall of the present invention must have an axial stiffness no greater than 100,000 pounds per inch and preferably no greater than 70,000 pounds per inch. At the same time, of course, the inner wall must be capable of supporting static loads in excess of 50,000 pounds, such as normally encountered in conventional drilling systems. Relatively few structural materials possess these characteristics. Steel for example has a Young's modulus of about $30 \times 10^6$ pounds per square inch and therefore would have to be machined to a thickness below 0.060 inch in order to reduce the axial stiffness of a 30-foot section below 100,000 pounds per inch and still provide a relatively high section modulus to resist Euler buckling. It therefore could not provide the necessary wear and corrosion resistance to be of practical value. Examples of suitable materials include aluminum, titanium and fiber-reinforced thermosetting resins such as epoxy resin reinforced with Fiberglas or nylon.

Figure 1:
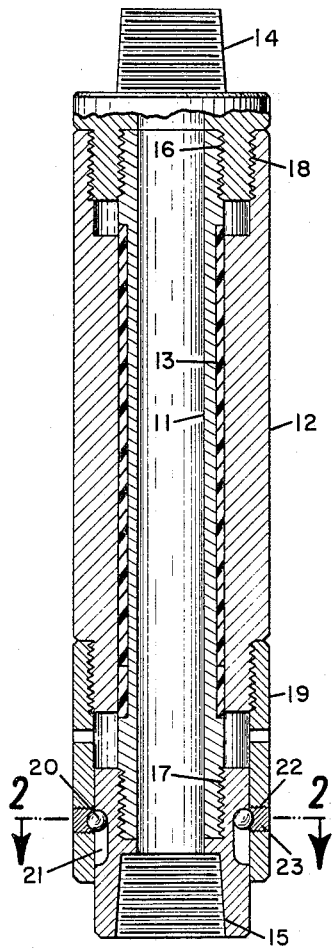
FIGURE 1 is a longitudinal sectional view of an embodiment of the invention wherein ball-bearing splines tranmit excess torsional, compressional, and tensile loads.

Referring to FIGURE 1, a preferred embodiment of the invention is shown, which includes inner tubular wall 11, outer tubular wall 12, sleeve bearing 13, externally threaded pin or coupling means 14, and thread box 15. Tubular wall 11 is rigidly attached at points 16 and 17 to coupling means 14 and thread box 15, respectively. Tubular wall 12 is attached to coupling means 14 by means of threaded connection 18.

A special coupling means is provided between the lower end of wall 12 and thread box 15, including sleeve member 19 and ball bearing splines 20. Longitudinally elongated recesses 21 are provided along the outside of thread box 15, in radial alignment with threaded bores 22 provided in sleeve member 19. Threaded bores 22 have a diameter sufficient to permit the insertion of ball members 20, and are fitted with plugs 23 having spherical seats therein to accommodate balls 20.

In operation, axial loading of the tool places inner tubular wall 11 in compression, thereby displacing box 15 upward with respect to sleeve 19. Coincident with such displacement, balls 20 roll within recesses 21, while remaining seated against plugs 23. Thus the essential spring character of the tool depends upon the Young's modulus and tensile strength of inner wall member 11. In order to function satisfactorily as a vibration filter, the axial spring constant of the inner wall member must be no greater than 100,000 pounds per inch. Thus steel, for example, would be entirely unsuitable for this purpose since a spring constant of less than 100,000 pounds per inch could be built with steel only by allowing Euler buckling to be excessive or by providing a wall thickness of less than 0.060 inch for a 30-foot member. Such a large amount of Euler buckling or such a small thickness would of course provide grossly inadequate wear and corrosion characteristics for use in a rotary drill column.

The rest position of ball bearings 20 is at or near the upper end of recesses 21. The purpose of this feature is to prevent excess tensile loading of tubular wall 11. Such tensile loads bring bearings 20 to the upper limit of recesses 21, whereby excess tensile loads are transmitted through the bearings to sleeve 19 and outer wall 12.

Tubular wall 11 is subjected to compressional loads normally encountered in drilling in excess of that required to cause Euler buckling. Some buckling must be tolerated, however, the degree of buckling must be held safely within the elastic limit. A necessary function of outer wall 12 is to prevent such excess buckling. Sleeve bearing 13 protects the outer surface of wall 11 and the inner surface of wall 12 from friction wear.

Figure 2:
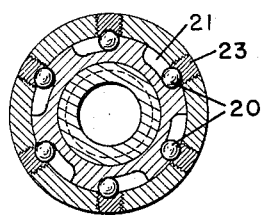
FIGURE 2 is a transverse section along the line 2—2 of FIG. 1.

FIGURE 2, a transverse section of the embodiment of FIGURE 1 taken through bearings 20, illustrates an additional function of the ball bearing splines. In the event inner wall 11 is subjected to excess torsional loads, thread box 15 is displaced rotationally with respect to sleeve 19. As shown in FIGURE 2, balls 20 have some degree of freedom to move circumferentially within recesses 21. However, when the limit of such freedom is reached, any additional torsional load is transmitted through the balls to sleeve 19 and wall 12.

Figure 3:
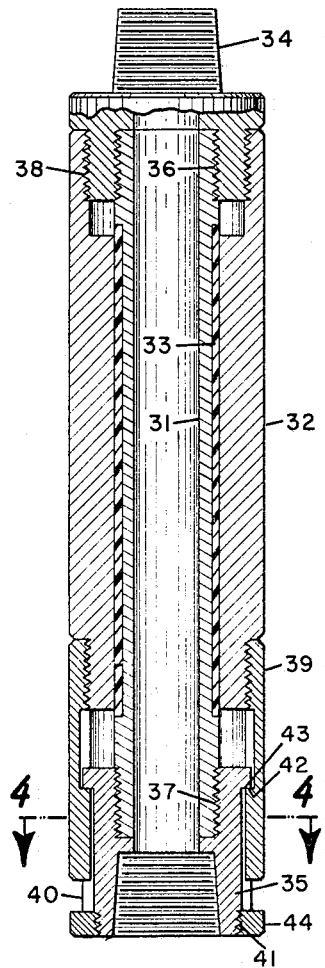
FIGURE 3 is a longitudinal section of an embodiment wherein excess torsional loading is transmitted by key-and-slot splines.

Referring now to FIGURE 3, a second embodiment of the invention is shown which includes inner tubular wall 31, outer tubular wall 32, sleeve bearing 33, externally threaded pin 34, and thread box 35. Tubular wall 31 is rigidly attached at points 36 and 37 to coupling means 34 and thread box 35, respectively. Tubular wall 32 is attached to coupling means 34 by means of threaded connection 38.

Splined coupling means are provided between the lower end of wall 32 and thread box 35, including sleeve 39 and splines 40. In operation, axial loading of the tool places inner tubular wall 31 in compression, thereby displacing box 35 upward with respect to sleeve 39. Such longitudinal displacement is freely permitted by the meshing of splines 40 with corresponding internal grooves of sleeve 39, thereby permitting inner wall 31 to carry the full amount of normal compressional loads. Thus the essential spring character of the designed tool depends entirely on the Young's modulus and tensile strength of inner wall member 31. In this respect a critical selection of structural material must be made for inner wall 31, for the same reasons as discussed in connection with inner wall 11 of the embodiment of FIGURE 1.

Similarly, the function of sleeve bearing 33 in the embodiment of FIGURE 3 is the same as that of bearing 13 in the embodiment of FIGURE 1. Sleeve bearings 13 and 33 may suitably be made of nylon or Teflon, for example.

Any substantial tensile loading of the embodiment shown in FIGURE 3 causes downwardly facing shoulder 43 of coupling 35 to engage upwardly facing shoulder 42 of sleeve member 39, thereby transferring such tensile loads to outer wall 32. Similarly, excess compressional loading of the tool causes the lower end of sleeve 39 to engage upwardly facing shoulder 44 thereby transmitting such excess compressional load to outer wall 32.

Figure 4:
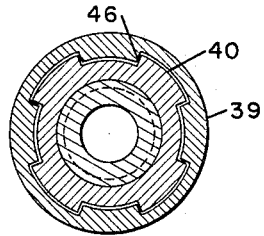
FIGURE 4 is a transverse section taken along line 4—4 of FIGURE 3.

FIGURE 4, a transverse section of the embodiment of FIGURE 3 taken in the splined interval, shows the meshing of splines 40 within slots 46 of sleeve 39. This arrangement permits normal axial loads to be borne entirely by inner wall 31, whereas torsional loads are transmitted to outer wall 32.

Figure 5:
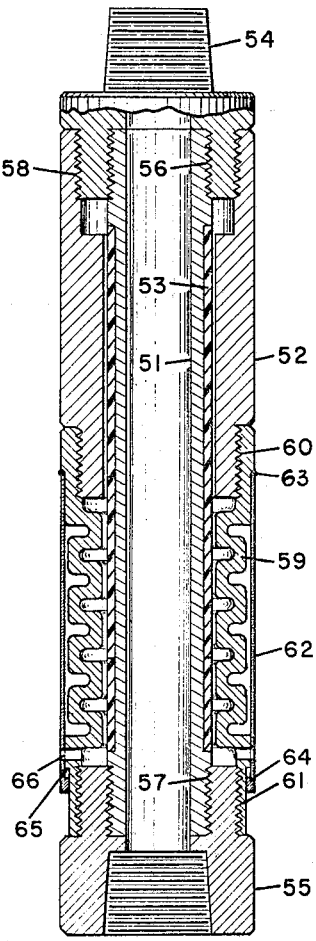
FIGURE 5 is a longitudinal section of an embodiment wherein the outer wall comprises a bellows-shaped interval.

Referring now to FIGURE 5, a third embodiment of the invention is shown, which includes inner tubular wall 51, outer tubular wall 52, sleeve bearing 53, externally threaded pin or coupling means 54, and thread box 55. Tubular wall 51 is rigidly attached by means of threaded connections 56 and 57 to coupling means 54 and 55, respectively. Tubular wall 52 is attached to coupling means 54 by means of threaded connection 58.

Bellows-shaped tubular convolutions 59 are rigidly connected between tubular wall 52 and coupling means 55 by means of threaded connections 60 and 61, respectively. In operation, axial loading of the tool places both tubular wall 11 and bellows 59 in compression. However, since the longitudinal spring constant of bellows 59 is much less than the axial spring constant of inner wall 51, the essential spring character of the tool depends primarily upon the Young's modulus and the tensile strength of inner wall 11. Similarly as in the case of the embodiments of FIGURE 1 and FIGURE 3, the axial spring constant of the inner wall member must be no greater than 100,000 pounds per inch and must be constructed of aluminum, titanium, or a fiber reinforced thermosetting resin or some equivalent material having a Young's modulus no greater than about $15 \times 10^6$ pounds per square inch and a tensile strength of at least 50,000 p.s.i.

An additional feature of this embodiment is the tubular safety sleeve 62, rigidly attached to element 59 at point 63. The lower end of the sleeve turns inward to form shoulder 64, which is designed to engage downwardly facing shoulder 65 in the event of excess tensile loading, thereby preventing possible damage to bellows-shaped convolutions 59. Breather ports 66 extend through the lower portion at elements 59 and 62. As with the first two embodiments, outer wall 52 in combination with elements 59 and 62 functions to prevent excessive buckling of the inner member, resists bending, and transmits excess torsional, compressional, and tensile loads.

Thus it can be seen that the vibration filter of the present invention is not subject to excessive wear between sliding parts and requires no fluid seals, thereby avoiding most of the disadvantages characteristic of the prior vibration control devices, while retaining a basic simplicity which ensures long life and economical operation.

It will now be apparent that the device of the present invention effectively isolates shocks or vibrations which originate at the drill bit, thus preventing such vibrations or shocks from being transmitted up the drill column to the surface equipment. This in turn will prevent excessive wear and damage to the drilling rig and to the drill stem, thereby prolonging their useful life. Moreover, by minimizing the effects of shocks and vibrations upon the drilling column and the associated machinery, a more continuous pressure is applied to the drill bit, whereby increased drilling rates, longer bit life and reduced hole deviation may be obtained.

What is claimed is:

1. A vibration isolator for a rotary drilling column which comprises inner and outer substantially concentric tubular members, the inside diameter of said outer member being at least 10 percent and no more than 20 percent greater than the outside diameter of said inner member, said inner member having a Young's modulus no greater than $15 \times 10^6$ p.s.i. and a tensile strength of at least 50,000 p.s.i., said outer member including at least one bellows-like convolution to provide a longitudinal spring constant no more than fifty percent as great as the longitudinal spring constant of said inner member, bearing means within the annular space between said inner and outer members for preventing excessive friction wear, and coupling means at opposite ends of said tubular members for rigid connection in a rotary drill column.

2. A vibration isolator for rotary drill columns comprising inner and outer substantially concentric tubular members, threaded coupling means rigidly attached at each end of said inner tubular member, said outer tubular member being rigidly attached at one end to said coupling means, and means at the opposite end of said outer tubular member for transmitting excess torsional, tensile and compressional loads, while preventing the transmission of compressional loads within some prescribed working load range of inner member.

3. A double-wall shock isolator comprising inner and outer subsantially concentric tubular members, said inner member having a Young's modulus no greater than about $15 \times 10^6$ pounds per square inch and a tensile strength of at least 50,000 p.s.i., coupling means at opposite ends of said tubular members for rigid connection in a rotary drill string, said coupling means including means for transmitting excessive torsional loads through said outer tubular member to the substantial exclusion of said inner tubular member, while permitting compressional loading of said inner tubular member to the substantial exclusion of said outer tubular member to a certain prescribed compressional loading limit.

4. A double-wall shock isolator comprising inner and outer substantially concentric tubular members, said inner member having a Young's modulus no greater than about $15 \times 10^6$ pounds per square inch, said inner and outer members being rigidly connected at one end to first coupling means for rigid connection in a rotary drill string, said inner member being rigidly connected at the opposite end thereof to second coupling means for rigid connection in a rotary drill string, and linkage means connecting said outer tubular member and said second coupling means for transmitting torsional loads to the substantial exclusion of compressional loads.

5. A shock isolator as defined by claim 4, wherein said linkage means comprises a system of ball bearing splines.

6. A vibration isolator for rotary drill columns comprising inner and outer substantially concentric tubular members, threaded coupling means rigidly attached at each end of said inner tubular member, said outer tubular member being rigidly attached at one end to said coupling means, means at the opposite end of said outer tubular member for transmitting excess torsional, tensile and compressional loads, while preventing the transmission of compressional loads within some prescribed working load range of said inner member, and means within the annulus between said tubular members for preventing excess buckling of said inner tubular member upon receiving compressional loads.

7. A device as defined by claim 6 wherein said means for transmitting torsional force comprises a plurality of longitudinal ribs extending inwardly of said outer tubular member and positioned to coincide with longitudinal slots provided in said coupling means.

References Cited by the Examiner

UNITED STATES PATENTS

| 1,594,579 | 8/1926 | Timbs et al. | 64—1 |
| 2,795,398 | 6/1957 | Ragland | 64—23 X |
| 2,815,928 | 12/1957 | Brodine | 175—323 X |

FOREIGN PATENTS

| 1,169,407 | 9/1958 | France. |
| 842,190 | 7/1960 | Great Britain. |

FRED C. MATTERN, JR., *Primary Examiner.*

HALL C. COE, *Examiner.*